United States Patent [19]

Stepien

[11] Patent Number: 4,670,853

[45] Date of Patent: Jun. 2, 1987

[54] COUPON COMPUTER AND METHOD FOR HANDLING COUPONS

[76] Inventor: Joyce A. Stepien, 1413 N. Battin, Wichita, Kans. 67208

[21] Appl. No.: 646,848

[22] Filed: Sep. 4, 1984

[51] Int. Cl.$^4$ .............................................. G06F 3/02
[52] U.S. Cl. ................................. 364/70 S; 150/147; 364/709
[58] Field of Search ...................... 364/70 S, 708, 709, 364/715, 900 MS File; 206/216, 42 S; 150/52 R, 131, 147

[56] References Cited

U.S. PATENT DOCUMENTS

| | | | |
|---|---|---|---|
| 4,075,702 | 2/1978 | Davies | 364/708 |
| 4,096,577 | 6/1978 | Ferber et al. | 364/708 |
| 4,222,109 | 9/1980 | Siwula | 364/70 S |
| 4,224,675 | 9/1980 | Pinkerman | 364/708 |
| 4,260,055 | 4/1981 | Slaybaugh | 206/42 S |
| 4,308,588 | 12/1981 | Siwula | 364/70 S |
| 4,334,278 | 6/1982 | Marmon | 364/709 |
| 4,446,528 | 5/1984 | Marmon | 364/709 |
| 4,463,848 | 8/1984 | Parker | 206/425 |
| 4,528,638 | 7/1985 | Hatta et al. | 364/71 S |
| 4,591,054 | 5/1986 | Blossom | 206/42 S |

Primary Examiner—Archie E. Williams
Assistant Examiner—Dale M. Shaw
Attorney, Agent, or Firm—John W. Carpenter

[57] ABSTRACT

An apparatus for handling manufacturer's discount coupons includes a sheet support, and at least one labeled pocket secured to said sheet support for defining files for holding and storing manufacturer's coupons. A coupon computer is mounted on the sheet support for storing information with respect to coupons the shopper may have so that the shopper may locate the coupon and apply the same to the purchase of an article. The coupon computer includes a keyboard for entering coupon information, and a first register for storing the coupon information. Coupon information may be retrieved from the coupon computer. A method for handling manufacturer's discount coupons including the step of typing on a keyboard of a computer which is attached to the sheet support coupon information comprising the name of the item the coupon represents, the size or brand of the item, the value of the coupon, the expiration date of the coupon, and the particular file which represents one of a plurality of pockets that are secured to the sheet support and which will hold and store the manufacturer's discount coupon. The method additionally includes situating the manufacturer's discount coupon in one of the plurality of pockets, entering the coupon information into a memory system of the computer, and typing on the keyboard of the computer the name of the item the coupon represents in order that the memory system may be searched to locate the coupon information.

8 Claims, 4 Drawing Figures

COUPON COMPUTER AND METHOD FOR HANDLING COUPONS

BACKGROUND OF THE INVENTION

1. Field of the Invention

This invention provides an apparatus for handling manufacturer's discount coupons. More specifically, this invention contemplates a novel apparatus for handling manufacturer's discount coupons which uses a coupon computer, and a method for handling manufacturer's discount coupons.

2. Description of the Prior Art

U.S. Pat. No. 4,334,278 by Marmon is directed specifically to a coupon calculator for determining the most economical purchase among products available in at least two (2) sizes and at different prices, in conjunction with a price reduction product coupon. The coupon calculator in Marmon requires no knowledge of algebra or calculator functions of the user, and it optimizes shoppers' decisions based on manual entry of product prices, sizes and coupon value. Marmon's coupon calculator does not indicate to the shopper where the coupon is located, such as at home or somewhere on the person of the user. The coupon calculator in Marmon is simply the application of the cents off coupon to the product that is to be purchased so that one may determine the value with respect to the price. Therefore, what is needed and what has been invented by me is a novel coupon computer which includes the feature of directing the user to the location of the coupon in order to save time and facilitate the use of coupons in shopping.

SUMMARY OF THE INVENTION

This invention accomplishes its desired objects by providing a means for handling manufacturer's discount coupons comprising a sheet support means, and at least one (1) labeled pocket secured to the sheet support means for defining files for holding and storing manufacturer's coupons. A coupon computer means is mounted to the sheet support means for storing information with respect to coupons that the shopper may have in order that the shopper may locate the coupon and apply the same to the purchase of an article. The coupon computer means includes a keyboard means for entering coupon information; a first register means for storing the coupon information: and a means for retrieving the coupon information. This information also accomplishes its desired objects by providing a method for handling manufacturer's discount coupons including the steps of typing on a keyboard means of a computer means which is attached to a sheet support means coupon information comprising the name of the item the coupon represents, the size or brand of the item, the value of the coupon, the expiration date of the coupon, and the particular file which represents one of a plurality of pockets that are secured to the sheet support means in which will hold and store the manufacturer's discount coupons. The method additionally includes situating the manufacturer's discount coupon in the one of the plurality of pockets, and entering the coupon information into a memory system means of the computer means; and typing on the keyboard means of the computer means the name of the item the coupon represents. The method finally comprises searching the memory system means of the computer means in order to locate the coupon information, storing the coupon information in the memory system of said computer means, and repeating all of the foregoing steps for all discount coupons to be used.

It is an object of the invention to provide a novel means for handling manufacturer's discount coupons.

Still further objects of the invention reside in the provision of a means and method for handling manufacturer's discount coupons which offers the feature of indicating to the user the location of the particular coupon that is to be used in shopping by the user.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 1:
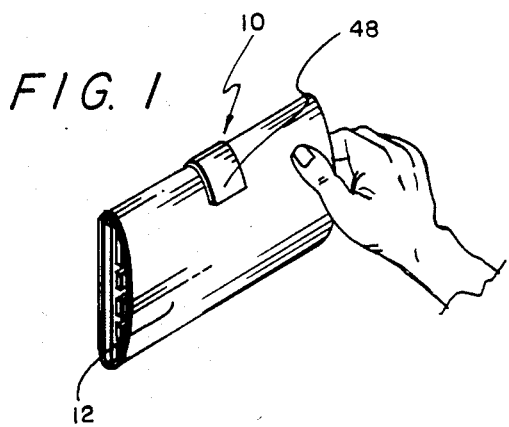
FIG. 1 is a perspective view of the apparatus for handling manuacturer's discount coupons in a closed position.
Figure 4:
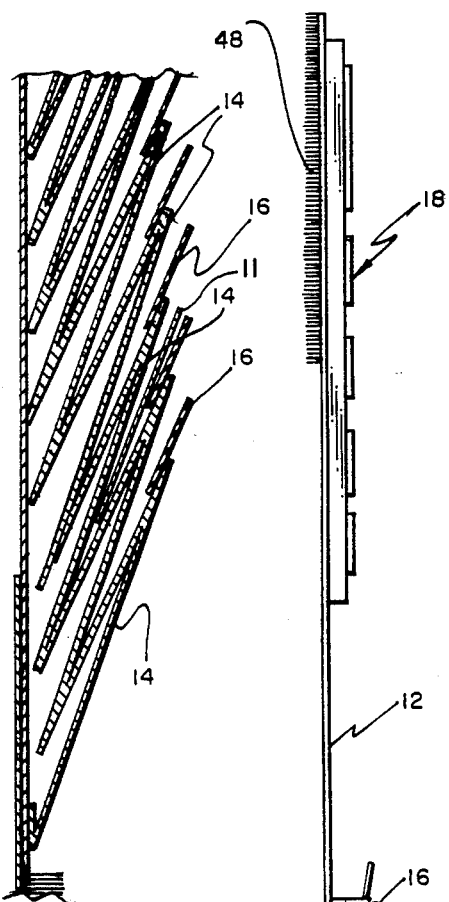
FIG. 4 is an enlarged partial vertical sectional view taken in direction of the arrows and along the plane of line 4—4 in FIG. 2.
Figure 2:
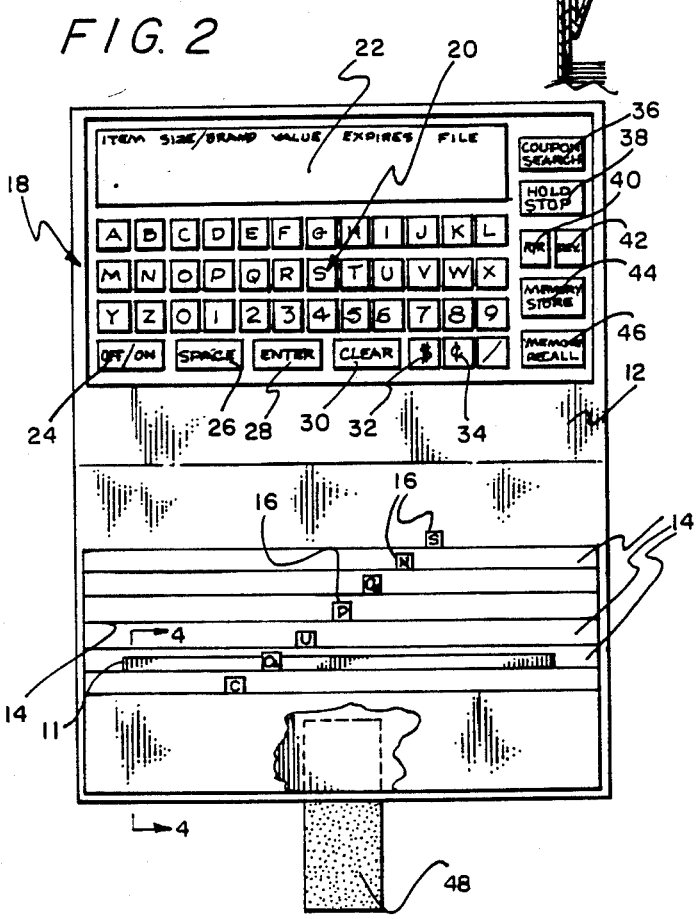
FIG. 2 is a top plan view of the apparatus of FIG. 1 but in an pen position in order to illustrate the pockets for holding the discount coupons and the computer which will store coupon information.
Figure 3:
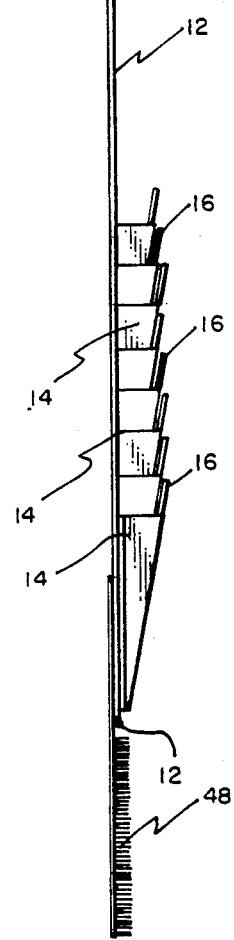
FIG. 3 is a side elevational view of the apparatus for handling manufacturer's discount coupons in an open position.

Referring in detail now to the drawings, wherein like reference numerals designate similar parts throughout the various views, there is seen an embodiment of the apparatus, generally illustrated as 10, for handling manufacturer's discount coupons. The apparatus 10 includes a pliable sheet support 12 which supports a plurality of overlapping pockets that define files with an alphabetical label 16 for holding and storing manufacturer's discount coupons. The pliable sheet support 12 also supports a computer means, generally illustrated as 18. The coupon computer 18 stores information with respect to coupons the shopper may have in order that the shopper may locate the coupon and apply the same to the purchase of an article. The coupon computer 18 comprises an alphabetical/numerical keyboard, generally illustrated as 20, for entering coupon information on a display screen 22. The coupon computer 18 additionally comprises off/on button 24, space button 26, enter button 28, clearing button 30, a dollar sign button 32, and a button representing cents which is represented by the reference numerals 34. The coupon computer 18 also additionally includes a coupon search button 36, a hold stop button 38 a button for forwarding 40, a button for reversing 42, a memory storage button 44, and a memory recall button 46. A fastener 48 is provided in order to hold the apparatus 10 in a folded position (see FIG. 1) when the pliable sheet support 12 is folded such that the plurality of pockets 14 are flushed against the face of the coupon computer 18.

The schematic diagram for operation of the computer 18 is readily discernable to those possessing ordinary skills in the art. Keyboard 20 is used by the shopper to enter coupon information reflecting the name of the item, the size/brand of the value of the discount coupon, the expiration date of the coupon and a pocket letter (e.g. A through Z) representing each of the pockets 14 that is labeled with the particular pocket letter 16 that was entered on the keyboard 20. This coupon information is conveyed through an input storage. All conveyances are preferably a single signal line, but it should be appreciated that the data may be conveyed in either parallel or serial form as known in the art. By pushing button (enter) 28 allows the input storage register to store data in the appropriate buffer. The procedure is repeated to store all discount coupons in the computer memory. A manufacturer's discount coupon 11 is stored in one of the labeled pockets 14 in order to be subsequently retrieved when the shopper desires to employ the use of the same.

Coupon information may be retrieved from the computer 18 by typing on the keyboard 20 the name of the item which the coupon represents. This information is displayed on the screen 22, and when subsequently depressing coupon search button 36, a searcher is activated which searches the input storage register and displays the discount coupon information. Subsequently when the memory storage button 44 is depressed, the coupon information is transferred into an output storage register. The foregoing steps are repeated for all discount coupons which are to be used or eventually used by the shopper at some time in the future.

The coupon information may be retrieved from the output storage by depressing the memory recall button 46 which brings up each coupon that is needed to be used by the shopper. The shopper subsequently checks the particular file on the computer screen 22 which represents one of the plurality of pockets 14 holding the particular manufacturer's discount coupon needed by the shopper. The coupon to be used at the store may be retrieved from the particular pocket by the shopper. After the discount coupon has been removed from a particular pocket 14, the memory recall button 46 should be depressed in order to delete from the computer memory the computer information related to the particular coupon that has been used. These steps are to be repeated for each coupon that the shopper has used.

The memory system of the computer 18 may be checked for expired coupons or no longer used coupons by merely depressing For. button 40 and/or Rev. button 42. In order to delete an expired or no longer used coupon from the memory system of the computer 18 the memory store button 44 is depressed once and the memory recall button 46 is depressed twice for each coupon that is to be deleted because of being expired or no longer used.

The apparatus of this invention may be embodied in a number of different forms which by now is clear to those skilled in the art. An arithmetic unit may be also utilized in order to receive conveyances originating from an arithmetic/storage register means. An arithmetic price unit may also be available to perform arithmetic calculations. An arithmetic unit, storage registers any comparator and/or drivers that are additionally employed by those skilled in the art may be combined into a single integrated circuit package, or can be included as separate packages. Display 22 is preferably a liquid crystal display in order to conserve power.

All of the various embodiments of this invention may preferably be constructed from integrated circuits, which are currently available to perform all of the functions described herein. It is also contemplated that most all of the logic requirements of this invention can be designed into a single integrated circuit package, which is thought to provide the most economical manufacturing situation.

U.S. Pat. No. 4,334,278 discloses a number of schematic diagrams for a number of embodiments each of the embodiments and/or schematic diagrams of the invention disclosed in this U.S. Patent may be incorporated into the subject invention which corrects a deficiency associated with the invention of U.S. Pat. No. 4,334,278, in that no means is provided in order to locate where the manufacturer's discount coupons are located. U.S. Pat. No. 4,334,278 by Marmon is incorporated herein by reference.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A means for handling manufacturer's discount coupons comprising
    a pliable sheet support means;
    at least one labeled pocket secured to said sheet support means for defining files for holding and storing manufacturer's coupons;
    a coupon computer means mounted to said sheet support means for storing information with respect to coupons the shopper may have so that the shopper may locate the coupon and apply the same to the purchase of an article;
    said coupon computer means comprises a keyboard means for entering coupon information;
    a first register means for storing the coupon information;
    a means for retrieving the coupon information; and a means for checking for expired or no longer needed coupon information.

2. The means for handling of claim 1 wherein said computer means additionally comprises a means for deleting from memory coupon information.

3. The means for handling of claim 2 wherein said keyboard means comprises alphabetical and numerical keys.

4. The means for handling of claim 3 wherein said computer means additionally comprises a screen means for registering the item, the size/brand of the item, and value of the coupon, the expiration date of the coupon, and the file corresponding to the labeled pocket that holds and stores the particular manufacturer's coupon.

5. A method for handling manufacturer's discount coupons by a shopper including the steps of:
    (a) typing on a keyboard means of a computer means which is attached to a pliable sheet support means coupon information comprising the name of the item the coupon represents, the size or brand of the item, the value of the coupon, the expiration date of the coupon, and the particular file which represents one of a plurality of pockets that are secured to said sheet support means and which will hold and store the manufacturer's discount coupons;
    (b) situating the manufacturer's discount coupon in said one of said plurality of pockets;
    (c) entering said coupon information into a memory system means of said computer means:
    (d) typing on said keyboard means of said computer means the name of the item the coupon represents;

(e) searching the memory system means of said computer means in order to locate said coupon information which will be displayed on a computer screen of said computer means;

(f) restoring subsequently said coupon information in said memory system of said computer means:

(g) repeating steps (a)–(f) for all discount coupons to be used;

(h) recalling from said memory system means on said computer screen coupon information for each coupon that is to be used by the shopper:

(i) checking the particular file on the computer screen which represents said one of a plurality of pockets holding the particular manufacturer's discount coupon needed by the shopper;

(j) retrieving the coupon of step (i) from the particular file of step (i); and (k) repeating steps (h)–(j) for each coupon that is to be used by the shopper.

6. The method of claim 5 additionally comprising deleting simultaneous to step (j) from the memory system means of said computer means the coupon information on each coupon that is used by the shopper.

7. The method of claim 6 additionally comprising checking the memory system means of said computer means for expired coupons.

8. The method of claim 7 additionally comprising deleting expired coupons from said memory system means of said computer means.

* * * * *